Sept. 25, 1945.  A. W. GARDNER  2,385,409
FUEL CONTROLS
Filed Sept. 10, 1941  2 Sheets-Sheet 1
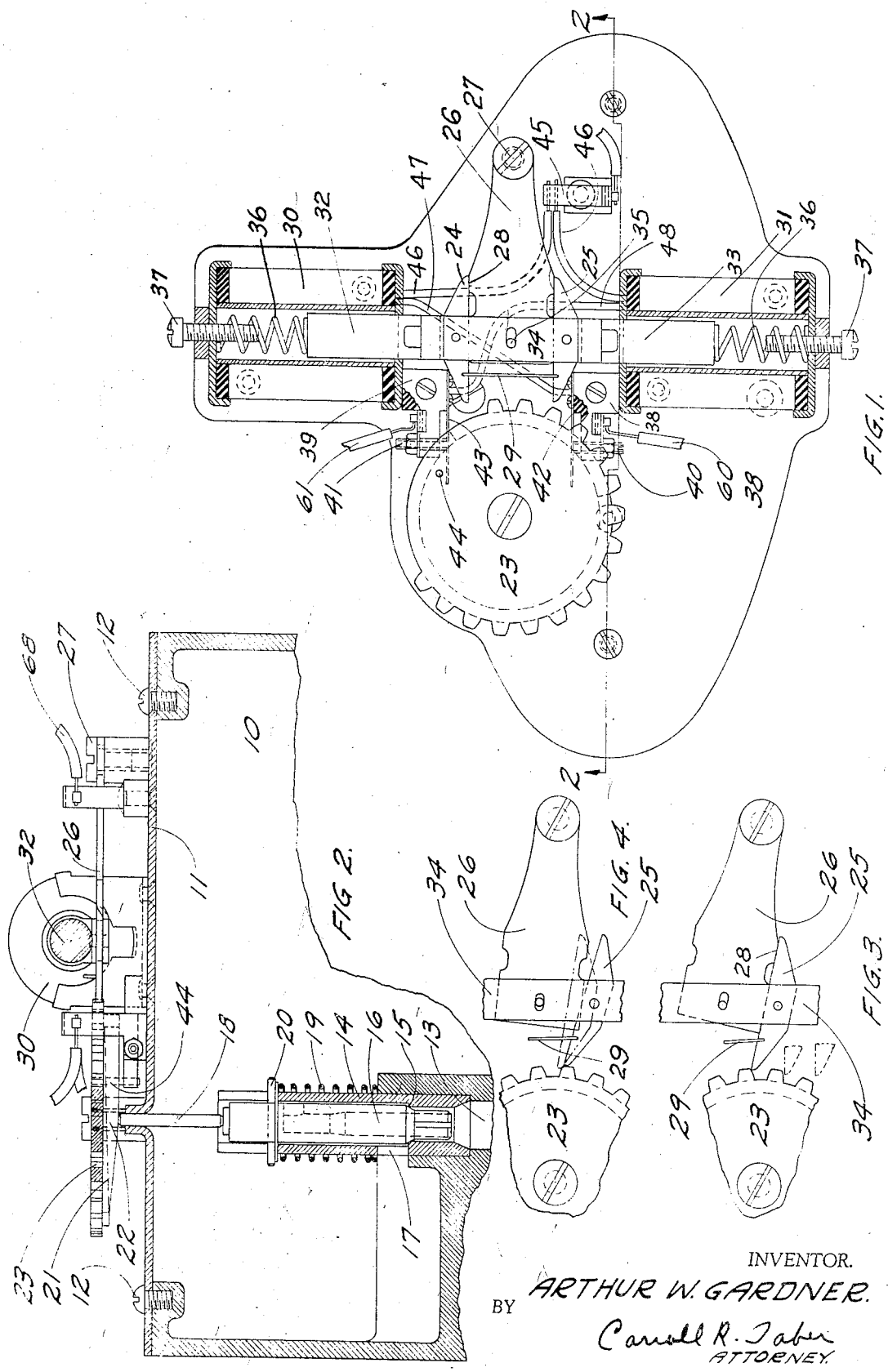
INVENTOR.
ARTHUR W. GARDNER.
BY Carroll R. Faber
ATTORNEY.

Patented Sept. 25, 1945

2,385,409

UNITED STATES PATENT OFFICE 2,385,409

FUEL CONTROL

Arthur W. Gardner, Macon, Ga., assignor to Motor Wheel Corporation, Lansing, Mich., a corporation of Michigan Application September 10, 1941, Serial No. 410,297

3 Claims. (Cl. 74—128)

This invention relates to automatic fuel controls for combustion apparatus adapted to consume liquid fuel at variable rates to produce a variable heat output.

Heretofore it has been the practice to control the fuel supply of combustion apparatus of the above mentioned type by manually opening and closing a valve, or by moving the valve between two manually adjusted positions by electrical means under the control of a thermostat. Neither of these methods is satisfactory because manual control is inconvenient and inaccurate, while semi-automatic control does not regulate the fuel supply in accordance with heat requirements.

The principal object of this invention is to provide an extremely simple and economical, wholly automatic device capable of application to a standard fuel regulating valve and which provides very accurate regulation of the quantity of fuel in accordance with the demands upon the heating system.

This object is attained by providing electrically operated ratchet mechanism for opening and closing the valve in small increments, and which is controlled by a thermostat under the influence of the space to be heated.

This object and others ancillary thereto will more fully appear in the following specification when read in connection with the accompanying drawings, wherein—

Figure 1 is a plan view of the ratchet mechanism applied to a fuel regulating valve mechanism;

Figure 2 is a cross-sectional view taken on substantially the line 2—2 of Figure 1;

Figures 3 and 4 are fragmentary plan views of a portion of the ratchet mechanism showing the parts in different positions.

Figure 5:
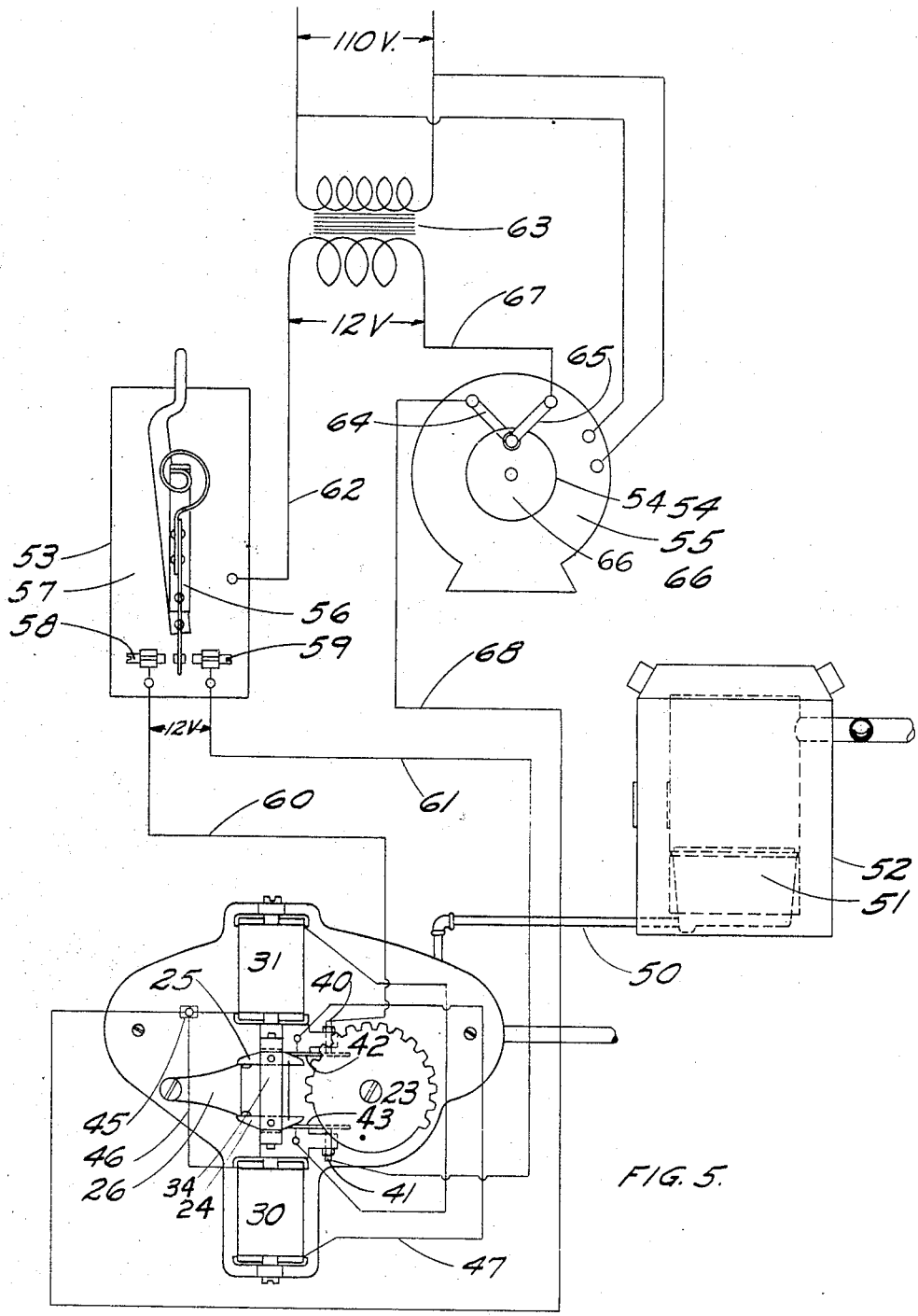
Figure 5 is a diagram illustrating the fuel regulating device and its controls as well as the electrical connections therefor.

The invention is shown as applied to a fuel regulating valve mechanism of standard construction. The valve mechanism is contained within a housing 10 having a top wall 11 secured thereto by screws 12. The housing has an outlet 13 adapted to be connected to an oil burner 51, Fig. 5. At the outlet is a sleeve 14 having a valve seat 15 against which a valve 16 is adapted to seat. The valve is reciprocable vertically within the sleeve and when lifted from its seat permits fuel to flow from the housing through a hole 17 in the sleeve past the valve into the outlet 13. Fuel is introduced into the housing from any suitable source of supply and is maintained at the desired level by any suitable means, such as a float valve (not shown).

The valve 16 has a stem 18 extending through a hole in the top wall 11. A coil spring 19 surrounds the sleeve 14 and engages a pin 20 extending through the valve 16 as well as the sleeve 14. The spring is under compression so that it tends to lift the valve 16 from the seat 15.

The valve 16 is moved downwardly towards its seat 15 by electrically operated valve adjusting apparatus, which when released permits the spring 19 to lift the valve toward its open position. This apparatus is operated in either direction in small increments to permit the valve to be opened or closed small amounts at a time.

The valve adjusting apparatus comprises a cam, a ratchet mechanism for moving the cam, and electrical means for operating the ratchet.

The cam is designated by the numeral 21. It is a disk rotatably mounted upon a vertical shaft 22 secured to the top wall 11 of the housing. The cam 21 has an inclined lower face which engages the upper end of the stem 18 so that when the cam is rotated in one direction the stem is forced downwardly by the cam and when the cam is rotated in the opposite direction the stem is lifted by the spring 19.

A toothed ratchet wheel 23 is attached to the cam. When the ratchet wheel is rotated it causes the cam to rotate. The ratchet wheel is moved by means of a pair of pawls 24 and 25. The pawls 24 and 25 are pivotally connected intermediate their ends to a bar 34 which is reciprocated relative to the ratchet wheel by electromagnetic means which will be described presently. The ends of the pawls adjacent the ratchet wheel 23 are adapted under certain conditions to engage the teeth of the ratchet wheel. The other ends of the pawls 24 and 25 normally engage abutments 28 rigid with an arm 26. The arm 26 is pivotally connected at one end to the top wall 11 by a screw threaded shaft 27. The other end of the arm 26 is connected to bar 34 by a pin 35 in a slot in the bar. The arm is shown in its neutral position in Figure 1.

The pawls 24 and 25 can pivot counterclockwise and clockwise respectively, but cannot pivot in the opposite direction. A spring 29 is connected to the outer ends of the pawls which tends at all times to separate said ends, or in other words, to force them toward the abutments 28.

Secured to the top wall 11 at opposite sides of the arm 26 are two solenoids 30 and 31. The solenoids are conventional hollow coils of wire. Armatures 32 and 33 are provided for the respective solenoids and are partially received therein. The ends of the armatures adjacent each other are secured to a bar 34. The bar 34 has a hole at its center which receives a pin 35 extending up from the arm 26. Thus, whenever the armatures move the arm 26 is caused to oscillate about its pivot 27.

Coil springs 36 within the solenoids tend to maintain the armatures in the positions shown in Figure 1 by resisting movement thereof into the solenoids. Screw threaded stops 37 limit the movement of the armatures in either direction.

A pair of blocks 38 and 39 of electrical insulating material is secured to the top wall 11 near the respective solenoids. The blocks 38 and 39 have contacts 40 and 41 threadedly secured thereto and projecting entirely through the blocks. Thin resilient strips of metal 42 and 43 are secured to the respective blocks 38 and 49 also. The strips 42 and 43 are arranged to touch the corresponding contacts 40 and 41, but can be flexed away therefrom under certain conditions which will appear presently. The strips 42, 43, and their contacts 40, 41 are limit switches.

Projecting downwardly from the underside of the ratchet wheel 23 is a pin 44. The pin 44 is so located on the cam that when the latter is rotated far enough either clockwise or counterclockwise it will strike one or the other of the flexible strips and bend it away from its contact.

One end of each of the solenoid coils 30 and 31 is connected to a terminal 45 on the top wall 11 by means of conductors 46. The other end of coil 30 is connected by a conductor 47 to the flexible strip 42. The corresponding end of the solenoid coil 31 is connected to flexible strip 43 by means of a conductor 48.

The outlet from the fuel valve housing 10 is connected by a pipe 50 to an oil burner 51 contained in a furnace 52. Fuel is fed to the burner through the pipe 50 at the rate determined by the setting of the valve 16.

Control of the valve setting is determined by two switches (see Fig. 5) connected together in series. The main switch is a thermostat switch 53. The other is a rotary switch which is opened and closed intermittently and is operated by a continuously rotating motor 55.

The thermostatic switch comprises a bimetallic arm 56 mounted on a base 57. Also mounted on the base 57 are two contacts 58 and 59, the former being the high temperature contact, and the latter being the low temperature contact. The high temperature contact 58 is connected by a conductor 60 to the contact 40 on the ratchet operating mechanism. The low temperature contact 59 is connected to the contact 41 by a conductor 61. The bar 56 of the thermostat is connected by a conductor 62 to one terminal of the secondary of a transformer 63.

The rotary switch 54 comprises a pair of flexible brushes 64 and 65 having their adjacent ends opposite each other and engaging opposite faces of a disk 66. The disk 66 consists primarily of electrical insulation but it has a small piece of electrical conducting material extending completely through it adjacent its periphery. The disk 66 is rotated continuously by the motor 54 driven from a source of electrical energy.

The brush 65 is connected by a conductor 67 to the secondary of transformer 63. Brush 64 is connected by a conductor 68 to terminal 45.

The thermostat is, of course, placed in the space to be heated and is adjusted so that when the temperature is below that desired the bar 56 bends and touches high temperature contact 58, while when the temperature is above that desired the bar bends and touches the low temperature contact 59. In either case the thermostatic switch is closed and current will flow every time the conducting piece in the disk 66 is in contact with the brushes 64 and 65, but only when they are in contact.

Assuming that the temperature of the space to be heated drops below that desired and the thermostatic switch closes against contact 58, current will flow through the conductor 62, bar 56, contact 58, conductor 60, contact 40, strip 42, conductor 47, solenoid 30, conductors 46 and 68, brushes 64 and 65, and conductor 67. Solenoid 30 is thereby energized and the armature 32 is attracted to it, pulling the arm 26 in a clockwise direction. See Figure 3. Pawl 25 will engage a tooth of the ratchet wheel 23 and move the wheel counterclockwise the width of a tooth. Cam 21 will be rotated to permit the valve 16 to open slightly and more fuel will flow to the burner.

The circuit will be closed only momentarily because the conducting piece in disk 66 will run out from between the brushes 64 and 65. As soon as this happens the solenoid is deenergized and the arm 26 is returned to its neutral position by spring 36. The pawl 25 swings about its pivot and rides over the tooth of the ratchet wheel in back of it, so as to be ready for operation the next time solenoid 30 is energized. See Figure 4.

If the temperature of the space to be heated has not reached the desired level, or that for which the thermostat is adjusted by the time the disk 66 makes one revolution, then the circuit is again closed when the brushes 64 and 65 are connected by the conducting piece and the process is repeated. That is, the ratchet wheel is moved counterclockwise another tooth. This is repeated until the temperature reaches such a point that the bar 56 disengages from contact 58.

Now, if the temperature should continue to rise, the bar 56 moves more to the right and touches contact 59, permitting the complete closing of the circuit of solenoid 31 every time the brushes 64 and 65 are connected. Solenoid 31 then acts to pull the arm 26 counterclockwise and cause the valve 16 to be closed slightly.

Thus, it will be seen that the valve is opened or closed in small increments and at definite intervals in accordance with temperature changes. The speed of the motor determines the rate of operation of the mechanism. Usually one revolution of the disk 66 per minute will accomplish proper regulation of the fuel supply.

If for any reason the valve is fully opened or fully closed before the bimetallic strip 56 of the thermostatic switch swings away from the contact which it is touching, continued rotation of the cam would cause damage to the apparatus. Therefore, the pin 44 is arranged to strike one or the other of the flexible strips 42 or 43 and spring it away from its contact. This breaks the circuit and prevents further operation of the device in the direction it was being rotated.

From the foregoing it will be seen that this invention provides a simple and economical fuel valve operating device which is positive and accurate in its operation. It can be employed with a standard fuel control with little or no alteration of the latter.

The scope of the invention is indicated in the appended claims.

I claim:

1. An electric power unit including a base plate having an opening therein for the reception of a member reciprocable perpendicular to the base plate, a cam mounted on said base plate and having a portion thereof overlying the said opening, said cam being mounted on said base plate for rotation in a plane parallel to the base plate, a ratchet wheel attached to said cam and rotatable therewith, and means for rotating said ratchet wheel comprising a bar adjacent said ratchet wheel and adapted to be reciprocated parallel to the plane of the ratchet wheel, a pair of spaced apart pawls carried by said bar and alternately in engagement with teeth on said ratchet wheel, one of said pawls being adapted to rotate said ratchet wheel in one direction, and the other pawl adapted to rotate the ratchet wheel in the opposite direction, electromagnetic means mounted on said base plate for oscillating said bar in one direction, and additional electromagnetic means mounted on said base plate for oscillating said bar in the opposite direction.

2. An electric power unit comprising a base plate having an opening therein adapted to receive a reciprocable valve member, a cam mounted on said base plate over said opening for rotation in a plane parallel to the base plate, a ratchet wheel attached to said cam and rotatable therewith, and means for rotating said ratchet wheel step by step in one direction or the other comprising a bar mounted on said base plate for movement parallel to the plane of the ratchet wheel, a pawl carried by said bar and engageable with said ratchet wheel, electro-magnetic means mounted on said base plate and connected to said bar for oscillating the latter, an electric switch mounted on said base plate and in circuit with said electro-magnetic means, and means on said ratchet wheel adapted to actuate said switch to open the same upon a predetermined rotation of said ratchet wheel in one direction.

3. An electric power unit comprising a base plate, a cam member mounted on said base plate for rotation in a plane parallel thereto, a ratchet wheel member attached to said cam member and rotatable therewith, a bar mounted adjacent said ratchet wheel for reciprocable movement relative thereto, a pawl carried by said bar and engageable with said ratchet wheel member, electro-magnetic means mounted on said base plate and connected to said bar for oscillating the latter, an electric switch mounted on said base plate and in circuit with said electro-magnetic means, and means on one of said members engageable with said switch to open the same upon predetermined rotation of said members in one direction.

ARTHUR W. GARDNER.